US012654103B2

(12) United States Patent
Takafuji et al.

(10) Patent No.: US 12,654,103 B2
(45) Date of Patent: Jun. 16, 2026

(54) NON-TRANSITORY COMPUTER-READABLE RECORDING MEDIUM HAVING STORED THEREIN GAME CONTROL PROGRAM, GAME CONTROL METHOD, AND INFORMATION PROCESSING APPARATUS

(71) Applicant: KOEI TECMO GAMES CO., LTD., Kanagawa (JP)

(72) Inventors: Yuishin Takafuji, Kanagawa (JP); Yusuke Norita, Kanagawa (JP); Kenta Shiraishi, Kanagawa (JP); Masanori Kawai, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 294 days.

(21) Appl. No.: 18/344,139

(22) Filed: Jun. 29, 2023

(65) Prior Publication Data

US 2024/0075387 A1 Mar. 7, 2024

(30) Foreign Application Priority Data

Sep. 1, 2022 (JP) ................................. 2022-138936

(51) Int. Cl.
| | |
|---|---|
| *A63F 13/58* | (2014.01) |
| *A63F 13/56* | (2014.01) |
| *A63F 13/822* | (2014.01) |

(52) U.S. Cl.
CPC .............. *A63F 13/56* (2014.09); *A63F 13/58* (2014.09); *A63F 13/822* (2014.09)

(58) Field of Classification Search
None
See application file for complete search history.

(56) References Cited

U.S. PATENT DOCUMENTS

| | | | |
|---|---|---|---|
| 6,525,736 B1 | 2/2003 | Erikawa et al. | |
| 10,016,682 B1 * | 7/2018 | McNeill | ................. A63F 13/58 |

FOREIGN PATENT DOCUMENTS

| | | |
|---|---|---|
| JP | 3163496 | 5/2001 |
| JP | 2011-000170 A | 1/2011 |
| JP | 2015-208674 A | 11/2015 |

OTHER PUBLICATIONS

English language translation of the following: Office action dated Feb. 10, 2026 from the JPO in a Japanese patent application No. 2022-138936 corresponding to the instant patent application. This office action translation is submitted now in order to supplement the understanding of the cited references which are being disclosed in the instant Information Disclosure Statement.

* cited by examiner

*Primary Examiner* — Sunit Pandya
(74) *Attorney, Agent, or Firm* — SOLARIS Intellectual Property Group, PLLC

(57) ABSTRACT

Provided is a non-transitory computer-readable recording medium having stored therein a game control program controlling a video game in which characters battle against each other in a three-dimensional virtual space, and causing a computer to execute: determining whether a second character has received a predetermined attack from a first character when the first character is battling against the second character, who is an enemy of the first character; and controlling the second character to perform a predetermined move such as a knockback in a direction toward a troop to which the second character belongs, in a case where the second character has received the predetermined attack.

20 Claims, 15 Drawing Sheets

Figure 6:
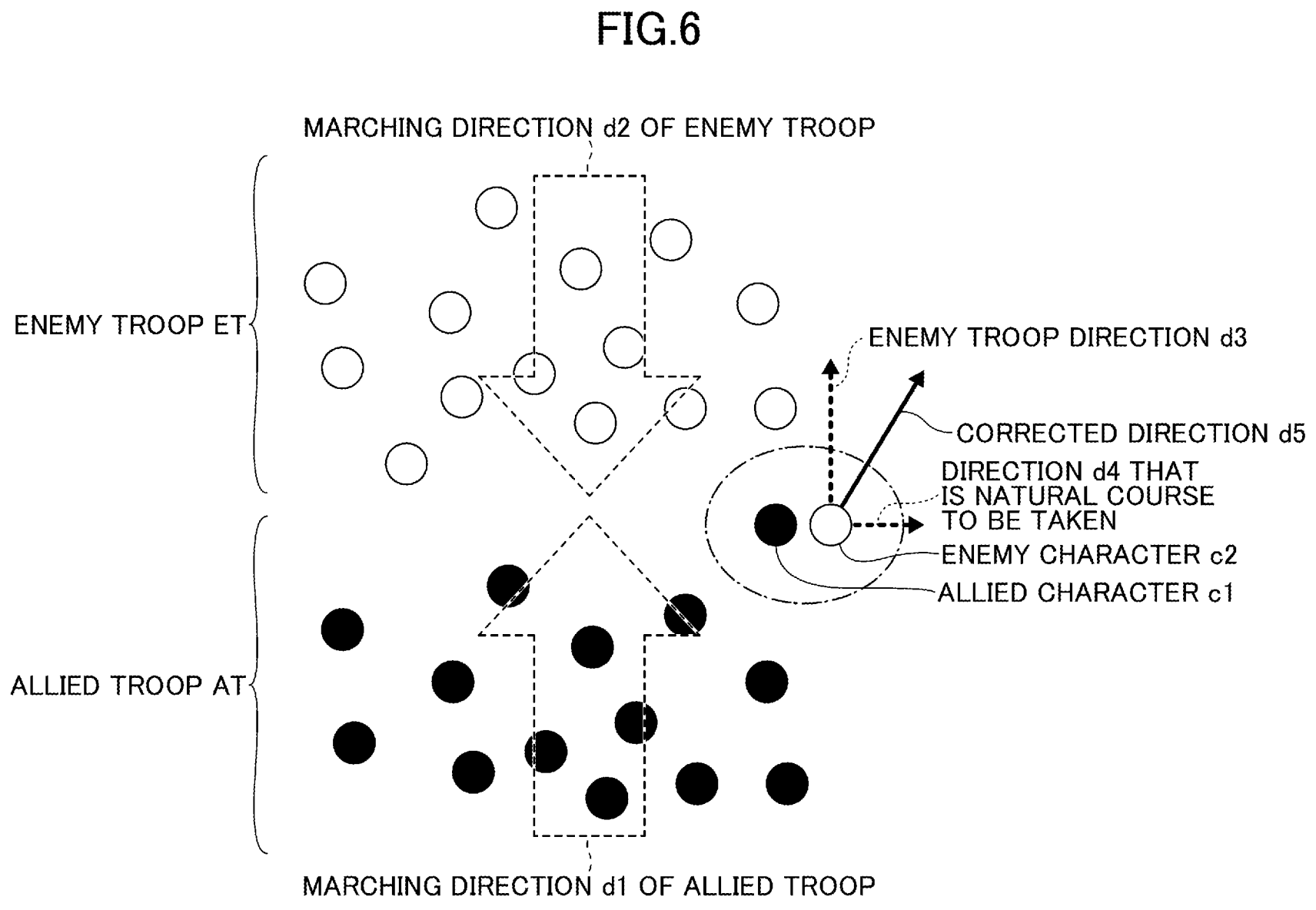

ENEMY TROOP DIRECTION d3

CORRECTED DIRECTION d5

DIRECTION d4 THAT IS NATURAL COURSE TO BE TAKEN

ENEMY CHARACTER c2

ALLIED CHARACTER c1

MARCHING DIRECTION d2 OF ENEMY TROOP

MARCHING DIRECTION d1 OF ALLIED TROOP

ENEMY TROOP ET

ALLIED TROOP AT

NON-TRANSITORY COMPUTER-READABLE RECORDING MEDIUM HAVING STORED THEREIN GAME CONTROL PROGRAM, GAME CONTROL METHOD, AND INFORMATION PROCESSING APPARATUS

CROSS-REFERENCE TO RELATED APPLICATION

The present application is based on and claims priority under 35 U.S.C. § 119 to Japanese Patent Application No. 2022-138936, filed on Sep. 1, 2022, the contents of which are incorporated herein by reference in their entirety.

BACKGROUND OF THE INVENTION

1. Field of the Invention

The present disclosure relates to control of each character acting in a group in a video game, and particularly relates to an invention for controlling the moves of a character after the character is attacked.

2. Description of the Related Art

In a video game, there is a case where a battle in which an allied troop and an enemy troop clash into each other may be played in a three-dimensional virtual space. In this case, if a plurality of allied-side Non-Player Characters (NPC) and a plurality of enemy-side NPCs get into a melee, enemy characters and allied characters become mingled and out-of-order. Therefore, the user (game player) may feel difficulty keeping track of how the battle is going.

Hence, an existing technique controls the moves of a troop formed of a leader character (e.g., a military commander) and a group of a plurality of characters (e.g., foot soldiers) who follow the leader character (see Patent Document 1). According to this technique, the group of characters move by keeping distance from one another and changing speed and directions, while following the leader character. This can make the battle situation as easy as possible to understand.

Moreover, instead of an Artificial Intelligence (AI) of each character controlling the character to move on its own, it has been common that a supervising AI of an allied troop issues instructions to the AI of each character constituting the allied troop and a supervising AI of an enemy troop issues instructions to the AI of each character constituting the enemy troop. Hence, the battle is played between one troop and another troop, each of which is formed of a plurality of characters gathering as one unit. This can contribute to making the battle situation as easy as possible to understand.

Patent Document 1: Japanese Patent No. 3163496

SUMMARY OF THE INVENTION

However, in a case where, for example, troops clash into each other obliquely as illustrated in FIG. 15, the behaviors of each troop may become unsuitable. In FIG. 15, a supervising AI of the allied troop is defining an allied troop region A and issuing instructions to AI of each allied character such as an allied character c1, while a supervising AI of the enemy troop is defining an enemy troop region E and issuing instructions to AI of each enemy character such as an enemy character c2. Then, depending on how the troops clash into each other, a melee may occur in some region (left-hand side), whereas an unnatural space may occur in some other region (right-hand side).

In such a case, existing techniques for making the leader character be followed cannot resolve the unsuitable behaviors illustrated in FIG. 15.

The present disclosure is made in view of the problem described above, and it is an object of the present disclosure to make it easy for the user to understand the battle situation by avoiding as much as possible enemy characters and allied characters becoming mingled and out-of-order when the enemy characters and allied characters are having a battle in a three-dimensional virtual space of a video game.

The invention according to claim 1 is a non-transitory computer-readable recording medium having stored therein a game control program controlling a video game in which characters battle against each other in a three-dimensional virtual space, and causing a computer to execute an attack content determining process of determining whether a second character has received a predetermined attack from a first character when the first character is battling against the second character, who is an enemy of the first character, and a move controlling process of controlling the second character to move in a direction toward a troop to which the second character belongs when the second character has received the predetermined attack.

As described above, according to the present disclosure, when enemy characters and allied characters are battling each other, as much care as possible is taken to avoid the enemy characters and the allied characters becoming mingled and out-of-order. As a result, an effect of making it easy for the user to understand the battle situation is obtained.

BRIEF DESCRIPTION OF THE DRAWINGS

FIG. 4 is a diagram illustrating moving states of characters of each troop;

FIG. 5 is a diagram illustrating a knockback direction of an enemy character;

FIG. 6 is a diagram illustrating a first modified example of the first embodiment;

FIG. 11 is a diagram illustrating knockback directions and positions of enemy characters;

FIG. 13 is a diagram illustrating damage levels of enemy characters;

DESCRIPTION OF THE EMBODIMENTS

Embodiments of the present disclosure will be described below with reference to the drawings.

An embodiment illustrates controls of the state of an enemy character when an allied character attacks the enemy character in a case where enemy characters and allied characters battle against each other in a three-dimensional virtual space of a video game.

[Functional Configuration of Information Processing Apparatus]

Figure 1:
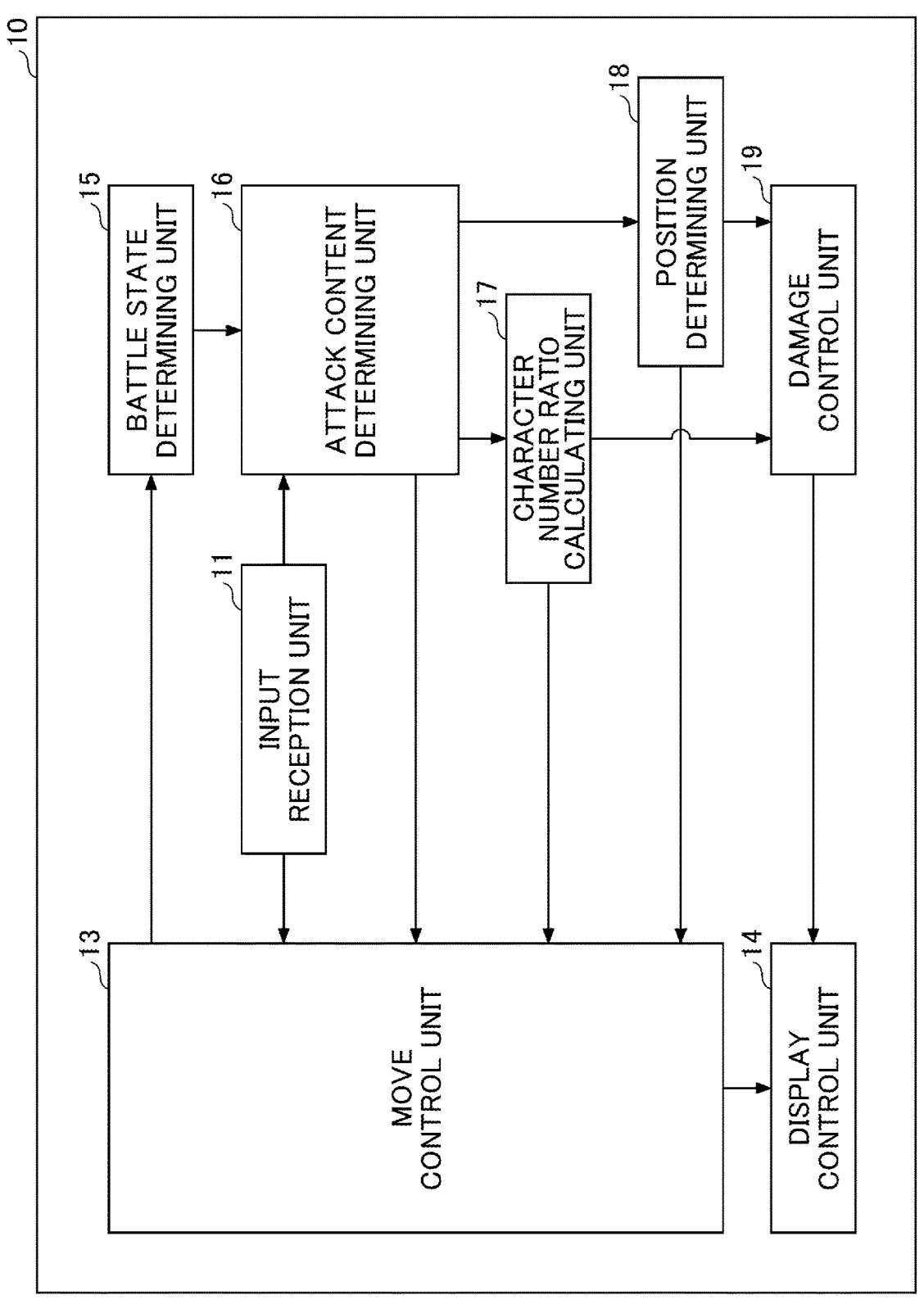
FIG. 1 is a diagram illustrating a functional configuration of an information processing apparatus according to an embodiment of the present disclosure.

First, with reference to FIG. 1, the functional configuration of an information processing apparatus 10 according to the present embodiment will be described. FIG. 1 is a diagram illustrating the functional configuration of the information processing apparatus according to an embodiment of the present disclosure. The information processing apparatus 10 is configured to control a video game in which characters battle against each other in a three-dimensional virtual space. Examples of the information processing apparatus 10 include a game console, a Personal Computer (PC), a smartphone, a smart watch, a car navigation terminal, and a server.

As illustrated in FIG. 1, the information processing apparatus 10 includes an input reception unit 11, a move control unit 13, a display control unit 14, a battling state determining unit 15, an attack content determining unit 16, a character number ratio calculating unit 17, a position determining unit 18, and a damage control unit 19. Each of these units is a process or a function realized by a game control program being executed by the information processing apparatus 10. Under the game control program, a supervising Artificial Intelligence (AI) configured to control the moves of a troop sets only the directions of the troop, instead of issuing instructions to individual AI configured to control the moves of each character. The character number ratio calculating unit 17 is realized in second and third embodiments described below, the position determining unit 18 is realized in modified examples of the second and third embodiments described below, and the damage control unit 19 is realized in the third embodiment and a modified example of the third embodiment described below.

Of these units, the input reception unit 11 is configured to receive a content that is input by a user (e.g., a game player) by operating an operation device 111 described below.

Figure 4:
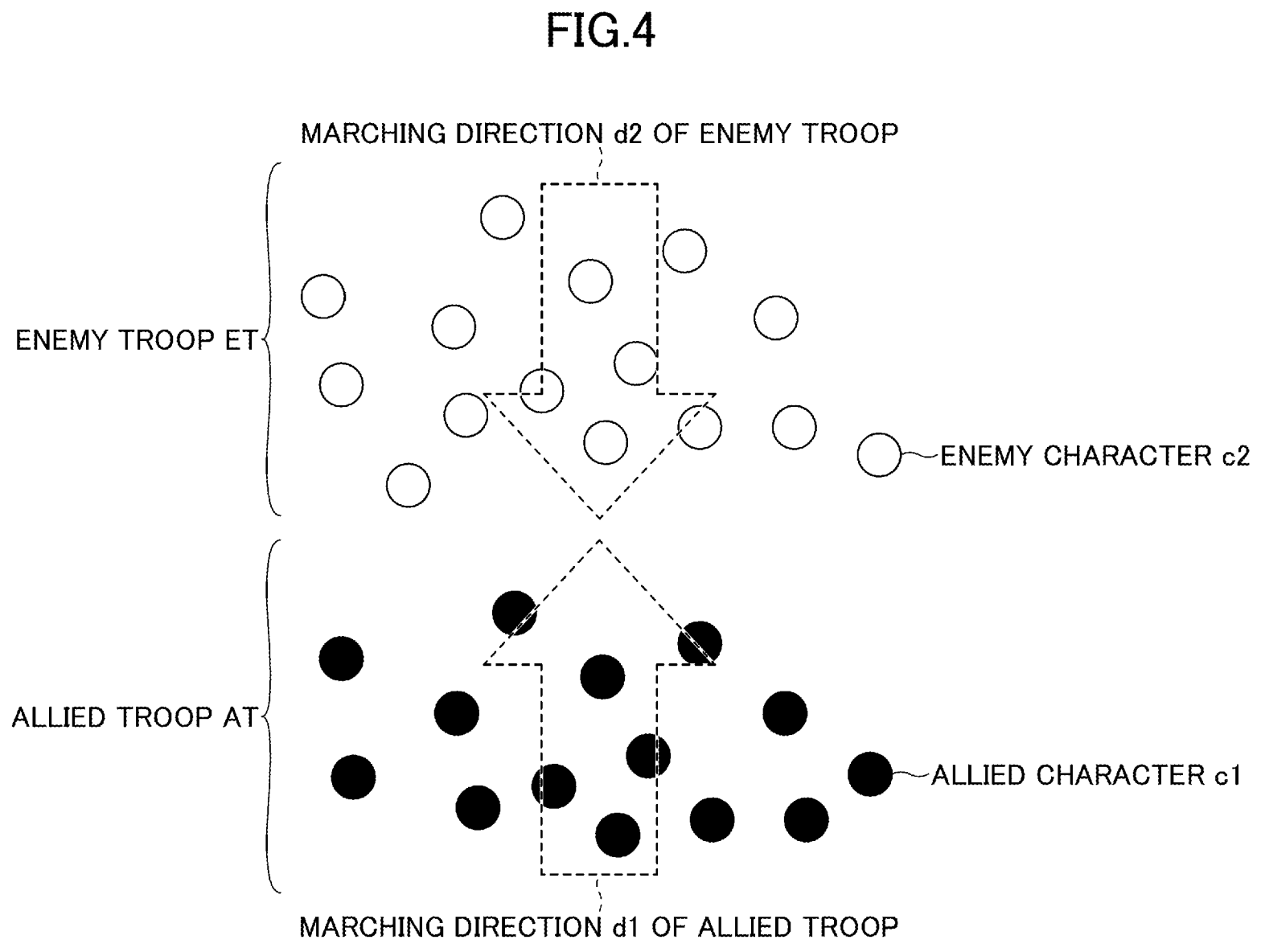
Figure 5:
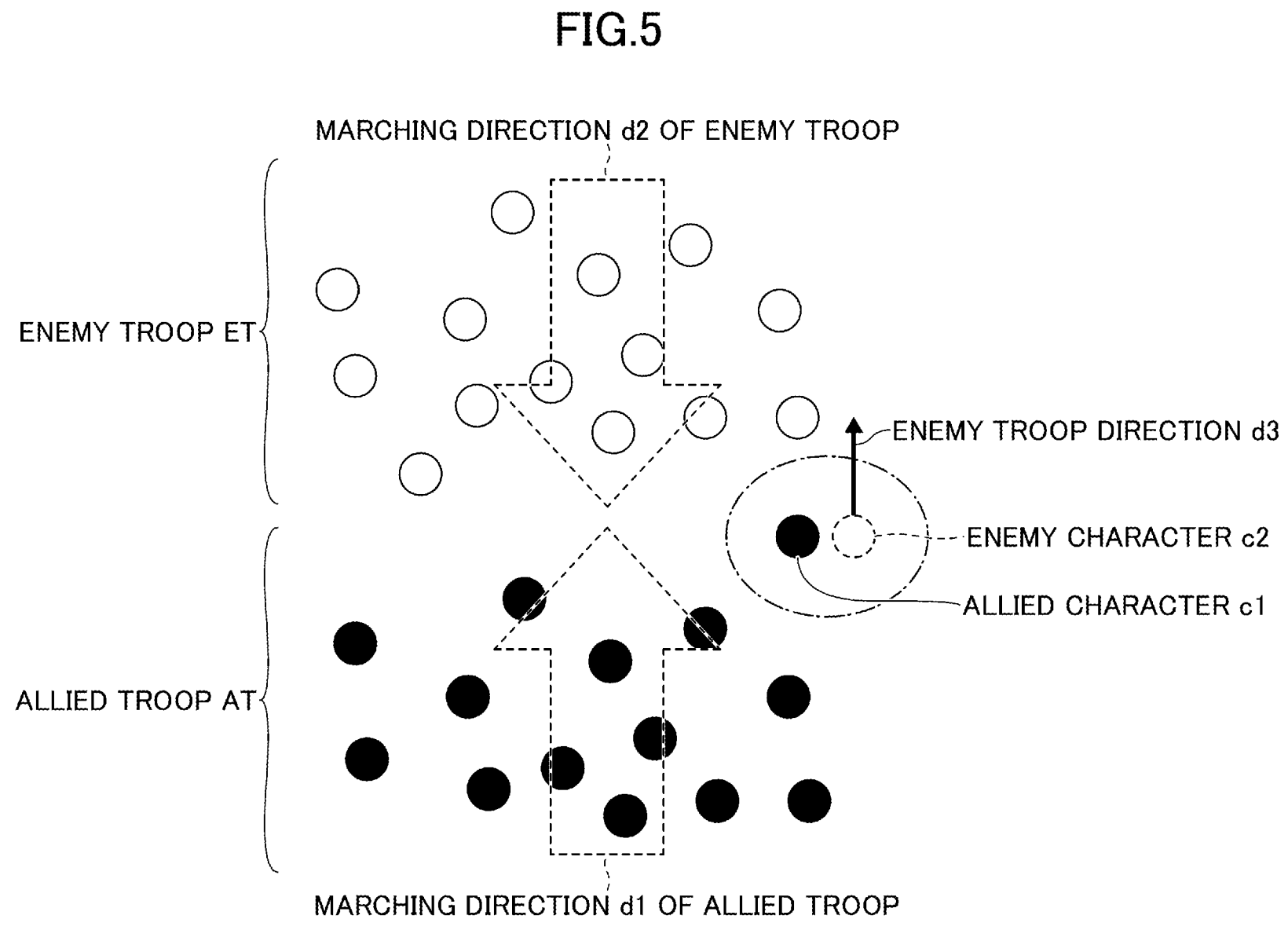

The move control unit 13 is configured to control the moves of, for example, an allied troop AT, each character (e.g., an allied character c1) of the allied troop AT, an enemy troop ET, and each character (e.g., an enemy character c2) of the enemy troop ET in a three-dimensional virtual space as illustrated in FIG. 4 described below. For example, the move control unit 13 is configured to knock back the enemy character c2 in a direction (enemy troop direction d3) toward the enemy troop ET to which the enemy character c2 belongs when the enemy character c2 receives a predetermined attack as illustrated in FIG. 5 described below. In FIG. 5, the direction (enemy troop direction d3) toward the troop (enemy troop ET) to which the enemy character c2 belongs is a direction that is opposite by 180° (exactly opposite) to a marching direction d2 of the troop to which the enemy character c2 belongs. The enemy troop direction d3 need not necessarily be exactly opposite, but need only be a direction inclined toward the enemy troop ET.

Figure 9:
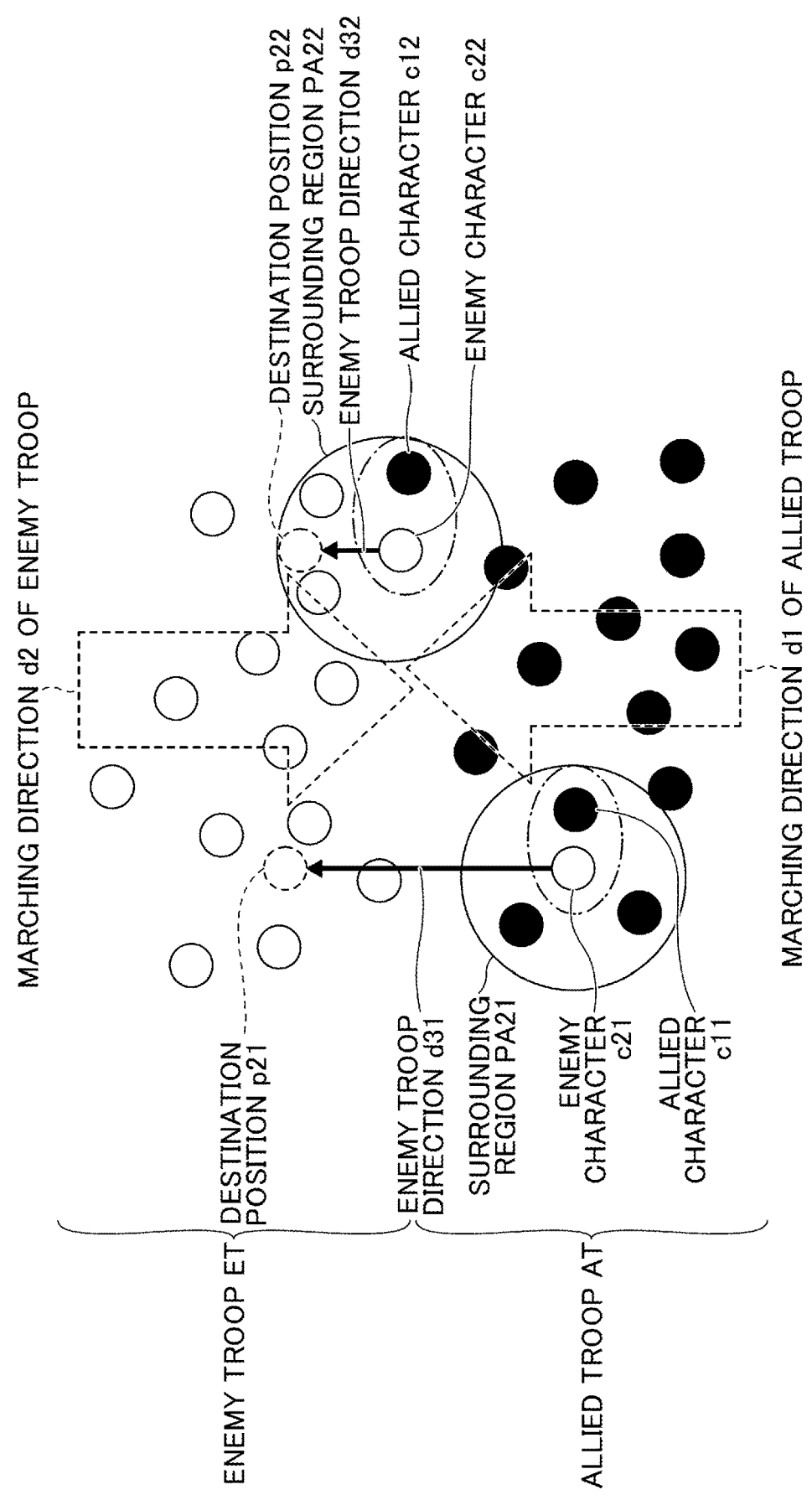
FIG. 9 is a diagram illustrating knockback directions and positions of enemy characters.

Alternatively, for example, as illustrated in FIG. 9 described below, the move control unit 13 is configured to knock back enemy characters c21 (c22) in enemy troop directions d31 (d32) while varying the distances by which the enemy characters c21 (c22) are knocked back in accordance with the ratio between the number of allied characters and the number of enemy characters in surrounding regions PA21 (PA22) of the enemy characters c21 (c22) who are attacked.

Figure 11:
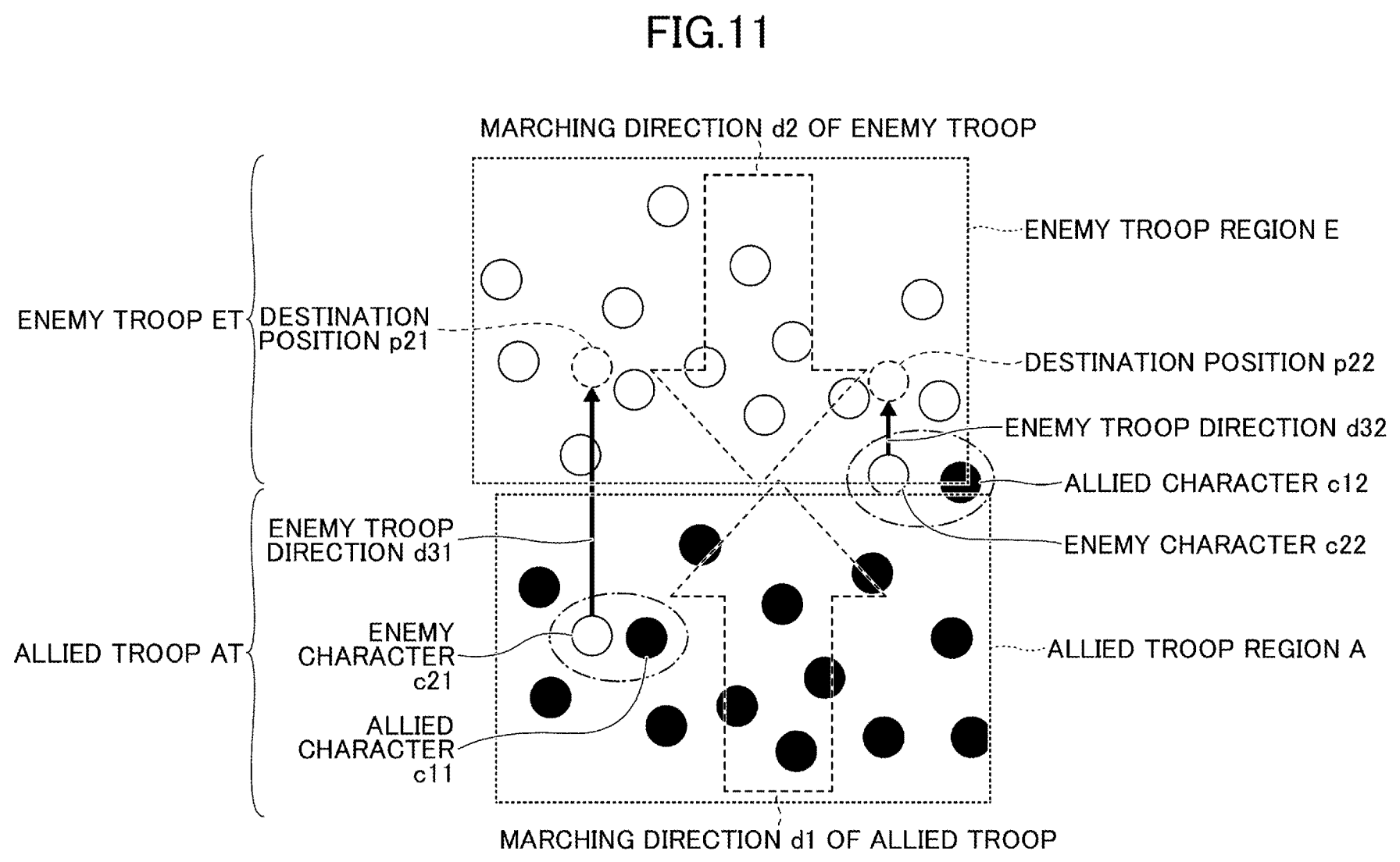

Alternatively, for example, as illustrated in FIG. 11 described below, the move control unit 13 is configured to knock back enemy characters c21 (c22) in enemy troop directions d31 (d32) while varying the distances by which the enemy characters c21 (c22) are knocked back in accordance with the positions of the enemy characters c21 (c22) in the three-dimensional virtual space.

The move control unit 13 is not limited to knocking back a character, so long as the move control unit 13 is configured to control a character to perform a predetermined move. Other examples of the predetermined move include "blow off" in which a character is moved in response to, for example, blowing of a virtual wind, and "warp" in which a character is moved to a destination instantly.

The display control unit 14 is configured to control a display device 110 described below to display images of the three-dimensional virtual space.

The battling state determining unit 15 is configured to determine whether, for example, an allied character c1 and, for example, an enemy character c2 have come into a battling state. In this case, the battling state determining unit 15 determines that a battling state has occurred when a predetermined allied character and a predetermined enemy character have come close to within a predetermined distance from each other.

The attack content determining unit 16 is configured to determine whether an enemy character has received a predetermined attack from an allied character when the allied character is battling against the enemy character.

Figure 7:
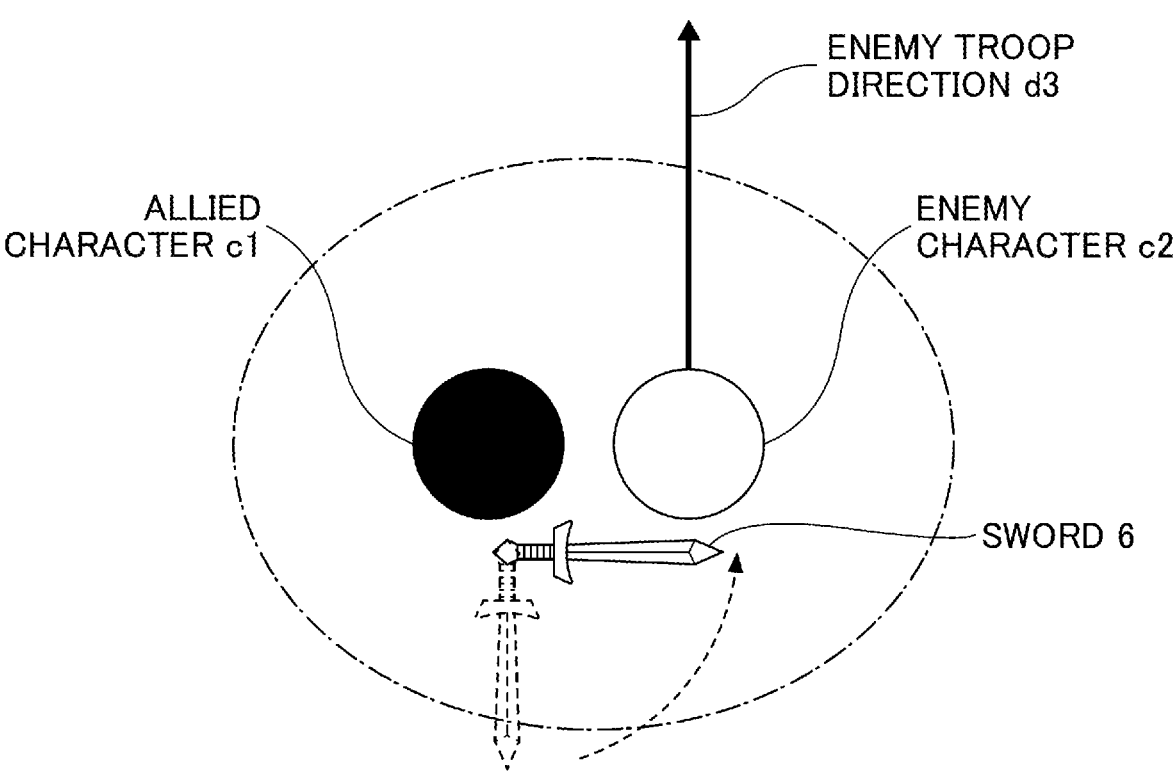
FIG. 7 is a diagram illustrating a second modified example of the first embodiment.

The predetermined attack is a "contact attack", a "contactless attack", a "direct attack", or an "indirect attack". The "contact attack" is an attack made by a martial art including a contact, such as slashing the opponent with a sword 6 as illustrated in FIG. 7 described below. The "contactless attack" is an attack made by using, for example, a missile (e.g., a bow and arrow, and a gun) and magic. The "direct attack" is an attack made by a martial art including a contact, such as slashing the opponent with a sword 6 as illustrated in FIG. 7 described below, or an attack made by a martial art including beating, such as punching the opponent. The "indirect attack" is an attack made by using a missile (e.g., a bow and arrow, and a gun). The predetermined attack also encompasses an attack made by administering a poison, without using a weapon.

The character number ratio calculating unit 17 is configured to calculate the ratio between the number of allied characters and the number of enemy characters in a predetermined surrounding region PA21 (22) of a predetermined enemy character who is attacked by allied characters as illustrated in FIG. 9. In this case, the predetermined enemy character who is attacked is basically counted in for calculation of the ratio, but need not necessarily be counted in. The predetermined surrounding region PA21 (22) is a region within a circle that centers on the predetermined enemy character and has a radius that is a predetermined multiple of the length between predetermined body parts of the predetermined enemy character. For example, the length between the predetermined body parts of the predetermined enemy character is the shoulder width of the predetermined enemy character, and the predetermined multiple is triple. The character number ratio calculating unit 17 may calculate the number ratio by counting in characters who are not the predetermined enemy character and whom a collision object of the predetermined enemy character is contacting. The "collision object" is a range based on which characters approaching each other is detected in order to perform an extrusion process for avoiding the characters overlapping each other. Every character is equipped with the collision object.

The position determining unit 18 is configured to determine the position of a character (e.g., an enemy character c2) who has received a predetermined attack in the three-dimensional virtual space.

The damage control unit 19 is configured to inflict damage of a varying level to a character in accordance with, for example, the position of this character determined by the position determining unit 18. For example, the "damage" represents, for example, reducing hit points of the attacked character, reducing life points of the attacked character, or de-buffing the attacked character (i.e., reducing the defensive capability or the offensive capability of the attacked character). The "damage" also encompasses extinguishing the attacked character.

[Hardware Configuration]

Figure 2:
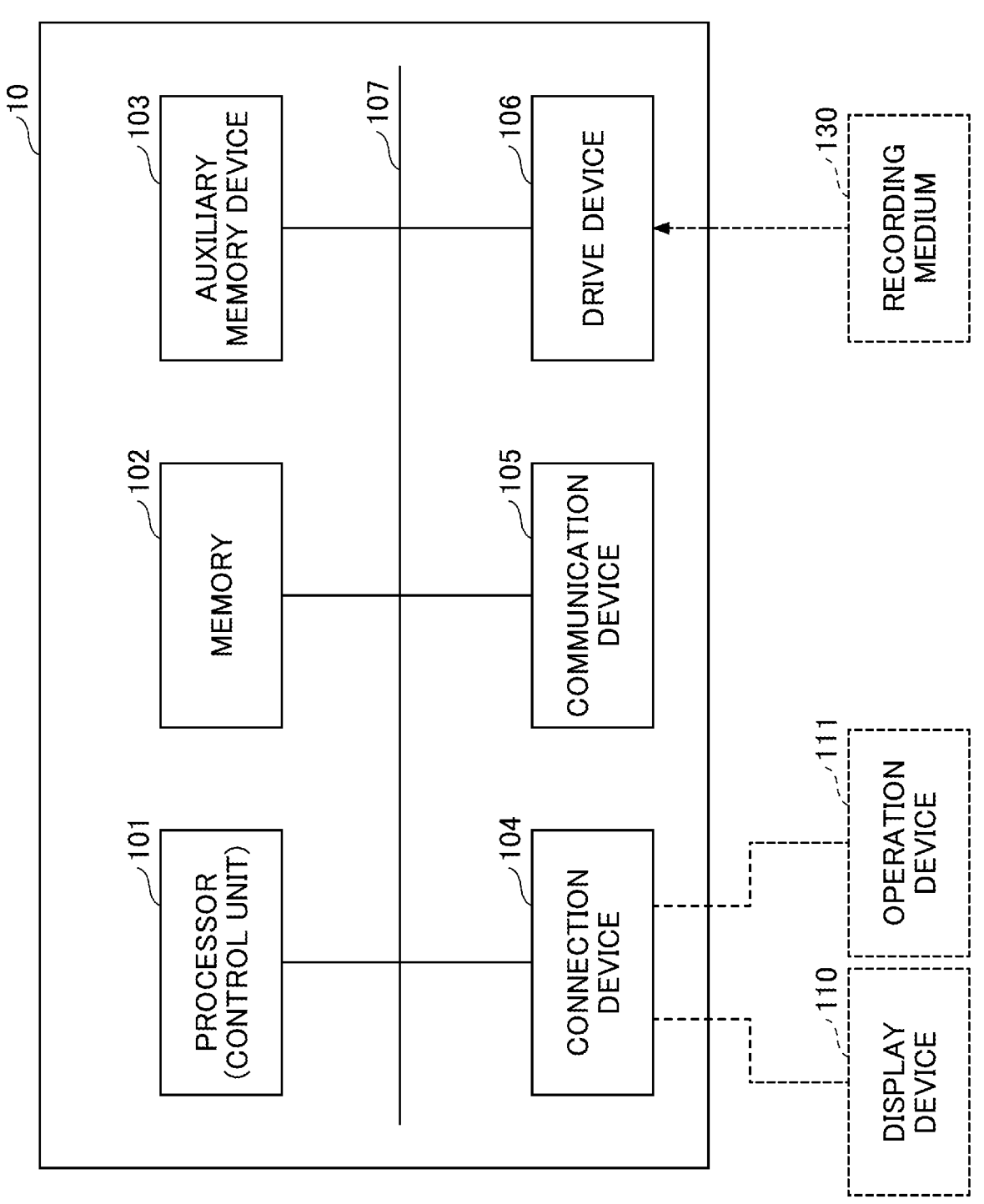
FIG. 2 is a diagram illustrating a hardware configuration of an information processing apparatus according to an embodiment of the present disclosure.

Next, with reference to FIG. 2, the hardware configuration of the information processing apparatus 10 will be described. FIG. 2 is a diagram illustrating the hardware configuration of the information processing apparatus 10 according to an embodiment of the present disclosure. As illustrated in FIG. 2, the information processing apparatus 10 includes a processor 101, a memory 102, an auxiliary memory device 103, a connection device 104, a communication device 105, and a drive device 106. These hardware pieces constituting the information processing apparatus 10 are mutually connected via a bus 107.

The processor 101 functions as a control unit configured to control the entirety of the information processing apparatus 10, and includes various kinds of operating devices such as a Central Processing Unit (CPU). The processor 101 is configured to read various programs (e.g., a game control program) into the memory 102 and execute the programs. The processor 101 may include General-Purpose computing on Graphics Processing Units (GPGPU).

The memory 102 includes main memory devices such as a Read Only Memory (ROM) and a Random Access Memory (RAM). The processor 101 and the memory 102 form what is generally referred to as a computer, and the computer realizes various functions by executing various programs (e.g., a game control program) read into the memory 102 by the processor 101.

The auxiliary memory device 103 is configured to store various programs and various information used when the various programs are executed by the processor 101.

The connection device 104 is a connection device configured to connect an external device (e.g., the display device 110 and the operation device 111) and the information processing apparatus 10 to each other.

The communication device 105 is a communication device configured to exchange various information with another device.

The drive device 106 is a device configured for a recording medium 130 to be set therein. The recording medium 130 meant here encompasses media configured to record information optically, electrically, or magnetically, such as a Digital Versatile Disc Read-Only Memory (DVD-ROM), a flexible disk, and a magneto-optical disk. The recording medium 130 may also encompass, for example, a semiconductor memory configured to record information electrically, such as a Read Only Memory (ROM) and a flash memory.

Various programs to be installed on the auxiliary memory device 103 are installed by, for example, a distributed recording medium 130 being set in the drive device 106 and the various programs recorded in the recording medium 130 being read out by the drive device 106. Alternatively, various programs to be installed on the auxiliary memory device 103 may be installed by being downloaded from a network via the communication device 105.

In a case where the information processing apparatus 10 is a server, image data representing a three-dimensional virtual space is sent to a communication terminal (e.g., a game console, a PC, a smartphone, a smart watch, and a car navigation terminal) through a communication network such as the Internet in accordance with various programs installed in the server. In this case, the communication device 105 receives operation data representing an operation performed by a user of the communication terminal, and the input reception unit 11 illustrated in FIG. 1 receives or admits the operation of the user.

First Embodiment

Process or Operation of Embodiment

Figure 3:
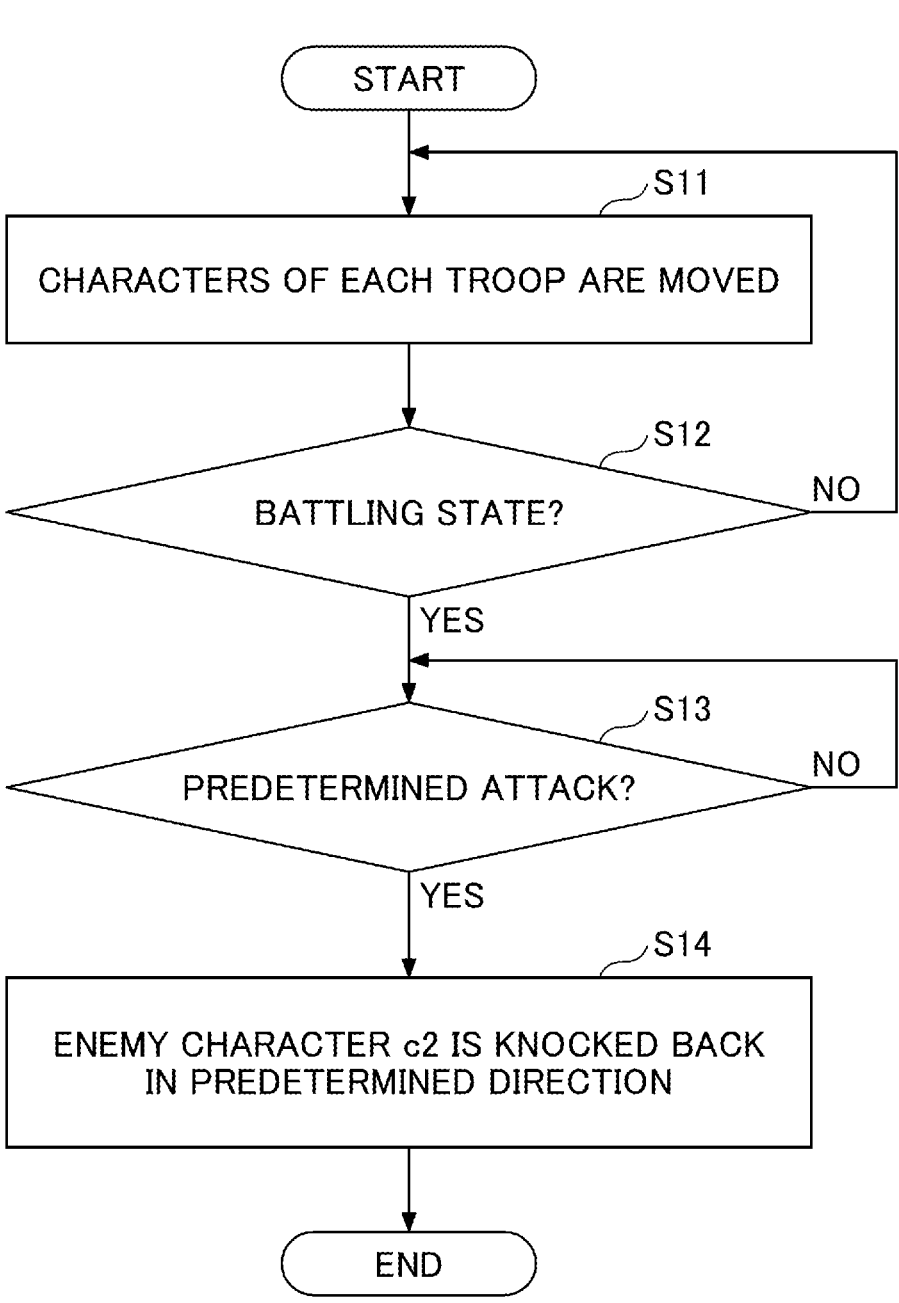
FIG. 3 is a flowchart illustrating a method for controlling moves of a character according to a first embodiment.

First, with reference to FIG. 3 to FIG. 7, the process or operation of the first embodiment will be described. FIG. 3 is a flowchart illustrating a method for controlling the moves of a character according to the first embodiment. FIG. 4 is a diagram illustrating the moving states of the characters of each troop. FIG. 5 is a diagram illustrating a knockback direction of an enemy character.

S11: As illustrated in FIG. 4, after the game is started, the move control unit 13 controls an allied troop AT, which is formed of a plurality of allied characters such as an allied character c1, to move in a marching direction d1 of the allied troop, while also controlling an enemy troop ET, which is formed of a plurality of enemy characters such as an enemy character c2, to move in a marching direction d2 of the enemy troop. In response, the display control unit 14 controls the display device 110 to display an image reflecting the move control performed by the move control unit 13.

S12: The battling state determining unit determines whether a predetermined allied character and a predetermined enemy character have come into a battling state. For example, FIG. 5 illustrates a state in which an allied character c1 and an enemy character c2 have started battling. In a case where a battling state has not occurred (S12; NO), the flow returns to the process of S11 described above.

S13: In a case where a battling state has occurred in S12 described above (S12; YES), the attack content determining unit 16 determines whether a predetermined attack has been performed. In FIG. 5, the allied character c1 is the offensive side, and the energy character c2 is the defensive side. In a case where the predetermined attack has not been performed (S13; NO), the process of S13 is repeated.

S14: In a case where the predetermined attack has been performed in S13 described above (S13; YES), the move control unit 13 knocks back the enemy character c2 in a predetermined direction (enemy troop direction d3). The enemy troop direction d3 is a direction toward the enemy troop ET when seen from the allied troop AT, and is, for example, a direction opposite to the marching direction d2 of the enemy troop.

Effects of Embodiment

As described above, according to the first embodiment, as illustrated in FIG. 5, by setting the direction in which the enemy character c2, who has departed from the enemy troop ET and come into the domain of the allied troop AT, is knocked back to the enemy troop direction d3, it is possible to avoid as much as possible enemy characters and allied characters becoming mingled and out-of-order. As a result, an effect of making it easy for the user to understand the battle situation is obtained.

First Modified Example

FIG. 6 is a diagram illustrating a first modified example of the first embodiment. As illustrated in FIG. 6, the move control unit 13 may take into consideration a direction d4 that is a natural course of knockback to be taken when an allied character c1 tries to knock back an enemy character c2, and may knock back the enemy character c2 in a predetermined direction (corrected direction d5), which is obtained as the resultant of the enemy troop direction d3 (vector) and the direction d4 (vector) that is the natural course of knockback to be taken. The direction d4 that is the natural course of knockback to be taken is a direction, which is naturally presumed as a course of knockback to be taken and exists on an extension of a line running from the allied character c1 to the enemy character c2.

By making the knockback direction of the enemy character c2 close to the direction in which the user causes the allied character c1 to attack the enemy character c2, it is possible to provide an effect of reducing the sense of strangeness that may be felt by the user, in addition to the effect of the embodiment described above.

Second Modified Example

FIG. 7 is a diagram illustrating a second modified example of the first embodiment. FIG. 7 is a partial expanded diagram of FIG. 5. As illustrated in FIG. 7, the move control unit 13 knocks back an enemy character c2 in the enemy troop direction d3 as in the first embodiment. Here, the move control unit 13 may control the allied character c1 to perform a motion of swinging a weapon (e.g., a sword 6) in accordance with the direction (enemy troop direction d3) toward the enemy troop ET to which the enemy character c2 belongs, in order to knock back the enemy character c2 in the enemy troop direction d3. In FIG. 7, in response to the allied character c1 swinging the sword 6 in the counterclockwise direction, the sword 6 revolves such that the sword 6 may hit the enemy character c2 in a direction toward the enemy troop direction d3.

By making the knockback direction of the enemy character c2 match the direction in which the user causes the allied character c1 to attack the enemy character c2, it is possible to provide an effect of reducing the sense of strangeness that may be felt by the user, in addition to the effect of the embodiment described above.

Second Embodiment

Process or Operation of Embodiment

Figure 8:
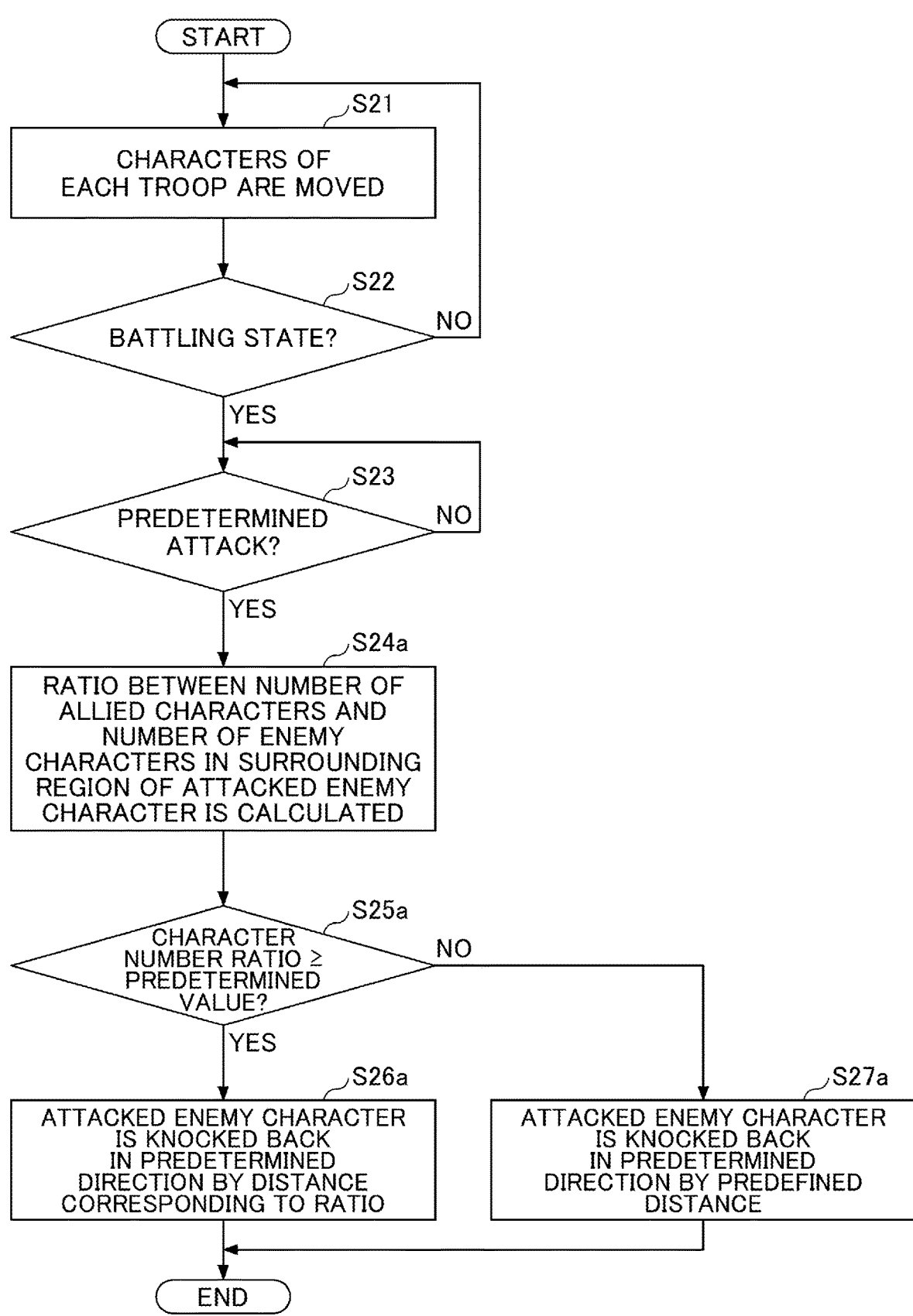
FIG. 8 is a flowchart illustrating a method for controlling moves of a character according to a second embodiment.

Next, with reference to FIG. 8 to FIG. 9, the process or operation of the second embodiment will be described. FIG.

8 is a flowchart illustrating a method for controlling the moves of a character according to the second embodiment. FIG. 9 is a diagram illustrating knockback directions and positions of enemy characters. S21 to S23 of FIG. 8 are the same processes as S11 to S13 of FIG. 3. Hence, description of the flowchart starts from S24*a* by omitting S21 to S23.

S24*a*: When a predetermined attack has been performed in S23 described above (S23; YES), the character number ratio calculating unit 17 calculates the ratio between the number of allied characters and the number of enemy characters in a surrounding region PA21 (PA22) of an enemy character c21 (c22), who has been attacked by an allied character c11 (c12) in FIG. 9.

S25*a*: The character number ratio calculating unit 17 determines whether or not the ratio of the number of allied characters to the number of enemy characters is greater than or equal to a predetermined value (e.g., greater than or equal to 3) as illustrated in FIG. 9.

Figure 15:
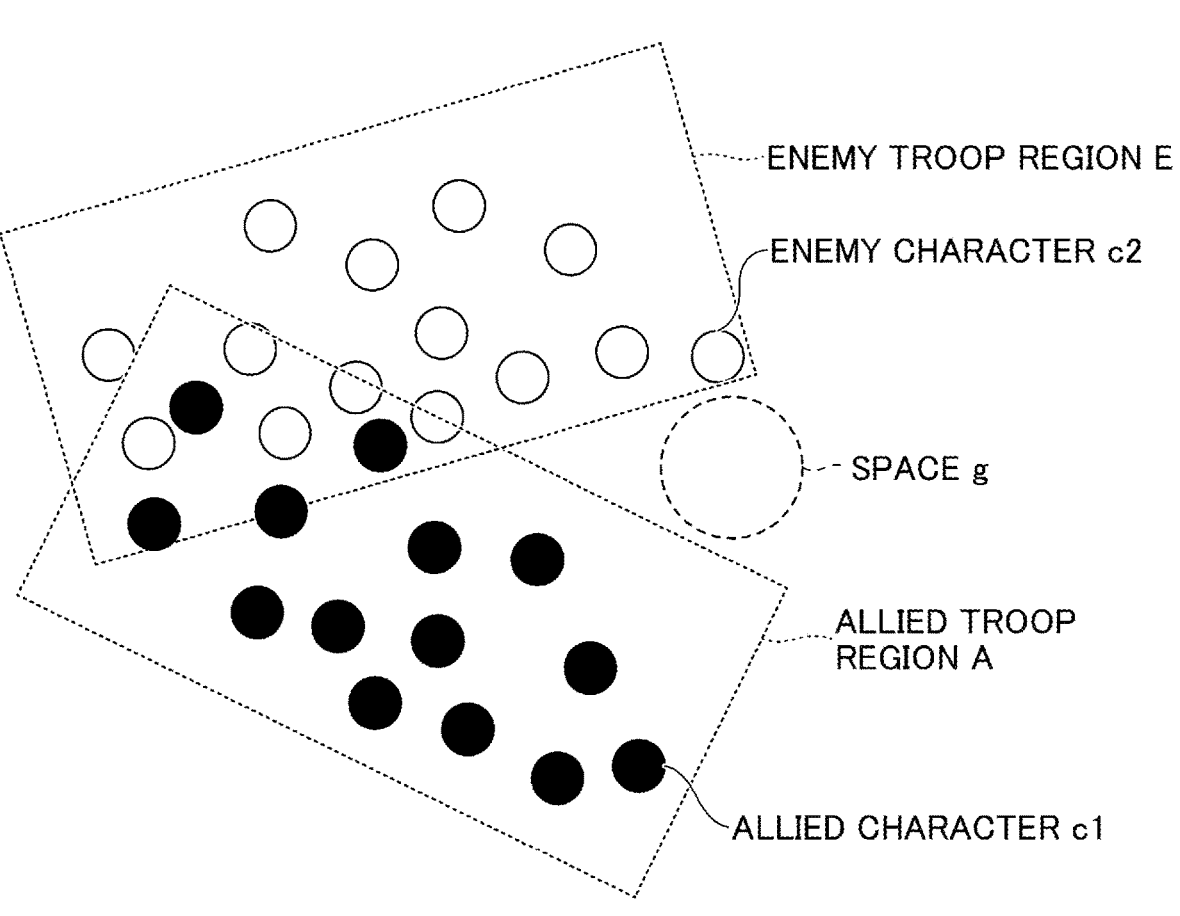
FIG. 15 is a diagram illustrating a state in which an allied troop and an enemy troop are mingled according to an existing technique.

S26*a*: When the ratio is greater than or equal to the predetermined value (S25*a*; YES), the move control unit 13 knocks back the attacked enemy character c21 in a predetermined direction (enemy troop direction d31) by a distance (first distance) corresponding to the ratio calculated by the character number ratio calculating unit 17. This can avoid the attacked enemy character c21 being left to stand alone in the allied troop AT, and can avoid enemy characters and allied characters becoming mingled and out-of-order. Moreover, by repeating such a knockback, it is possible to overcome a mingled state between enemies and allies illustrated in FIG. 15.

Examples of the distance (first distance) corresponding to the ratio include a distance proportional to the ratio, a distance that is a power of the ratio, and a distance that becomes longer stepwise in accordance with the ratio. In this case, examples of "the distance that becomes longer stepwise in accordance with the ratio" provided that "the ratio" is expressed as, for example, "number of allied characters/ number of enemy characters" in the surrounding region PA21 (PA22) include "a distance that is three times as long as the shoulder width of the attacked character" when the ratio is "3 or greater", "a distance that is a product between the shoulder width of the attacked character and the ratio" when the ratio is "2 or greater and less than 3", and "a distance that is twice as long as the shoulder width of the attacked character" when the ratio is "1 or greater and less than 2". The character number ratio calculating unit 17 may calculate "the ratio" as "number of enemy characters/number of allied characters" instead of "number of allied characters/number of enemy characters".

S27*a*: When the ratio of the number of allied characters, who are the offensive side, is not greater than or equal to the predetermined value (i.e., is less than the predetermined value) (S25*a*; NO), the move control unit 13 knocks back the attacked enemy character c22 in a predetermined direction (enemy troop direction d32) by a predefined distance (second distance). The predefined distance (second distance) is shorter than the first distance described above, and is a predetermined multiple (e.g., double) of the shoulder width, which is the length between predetermined body parts of the enemy character c22. Alternatively, the predefined distance is shorter than the first distance described above, and is a distance to a location contacting the enemy troop ET while existing within the surrounding region PA22 (see FIG. 9). The enemy troop direction d31 and the enemy troop direction d32 are the same direction as the enemy troop direction d3 of FIG. 5.

Modified Example

Figure 10:
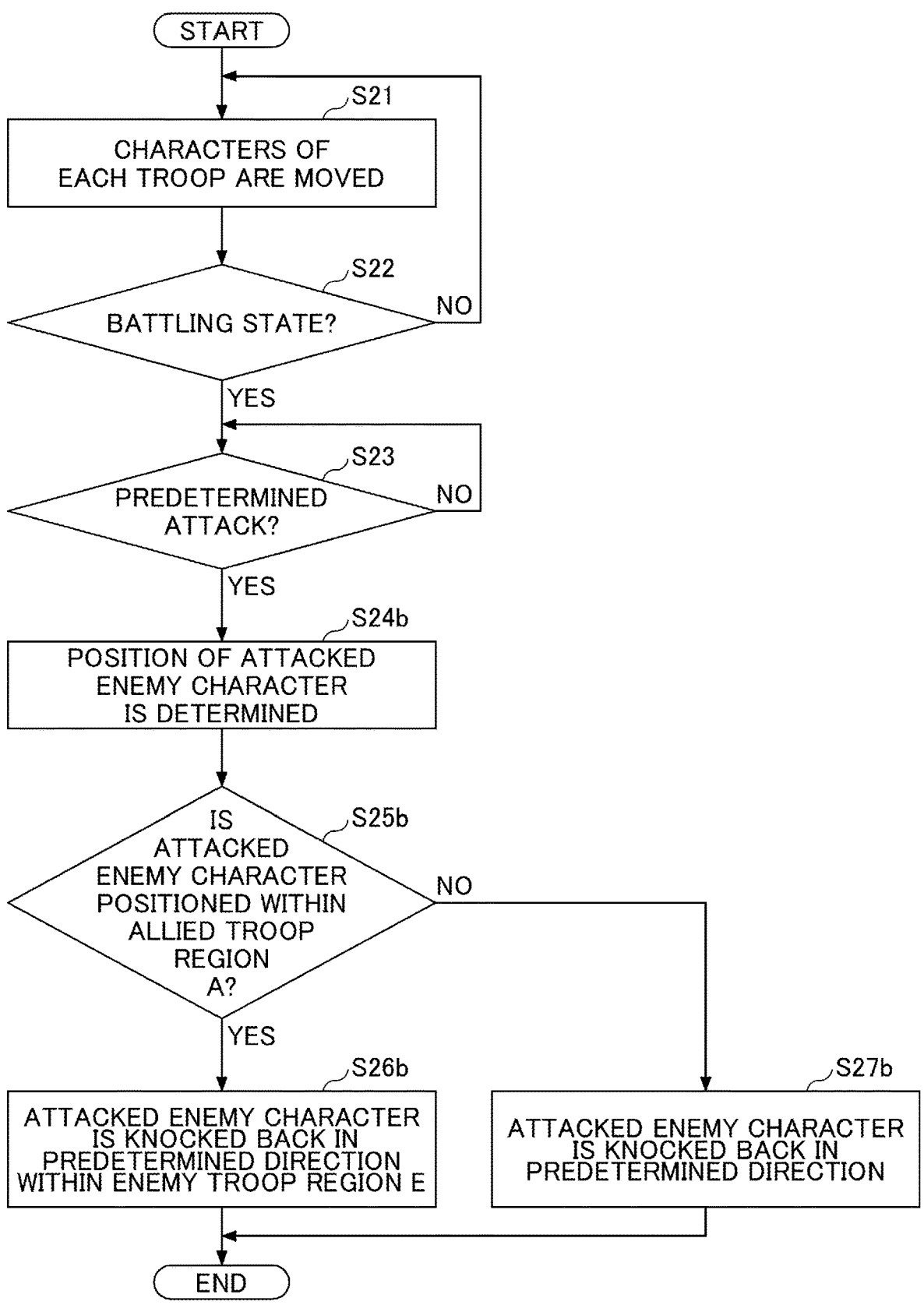
FIG. 10 is a flowchart illustrating a method for controlling moves of a character according to a modified example of the second embodiment.

Next, a modified example of the second embodiment will be described with reference to FIG. and FIG. 11. FIG. 10 is a flowchart illustrating a method for controlling the moves of a character according to a modified example of the second embodiment. FIG. 11 is a diagram illustrating knockback directions and positions of enemy characters. S21 to S23 of FIG. 10 are the same processes as S11 to S13 of FIG. 3. Hence, description of the flowchart starts from S24*b* by omitting S21 to S23.

S24*b*: When a predetermined attack has been performed in S23 described above (S23; YES), the position determining unit 18 determines the current position of an enemy character c21 (c22), who has been attacked by an allied character c11 (c12), in FIG. 11.

S25*b*: The position determining unit 18 determines whether the attacked enemy character c21 is positioned within an allied troop region A. The allied troop region A is a region in which the number of allied characters is greater than or equal to a first proportion (e.g., 90%), and the number of enemy characters is less than a second proportion (e.g., 10%) in a three-dimensional virtual space. The total of the first proportion and the second proportion is 100%, and the second proportion is lower (less) than the first proportion. Likewise, an enemy troop region E is a region in which the number of enemy characters is greater than or equal to a first proportion (e.g., 90%), and the number of allied characters is less than a second proportion (e.g., 10%) in three-dimensional virtual space.

S26*b*: When the enemy character c21 is positioned within the allied troop region A as illustrated in FIG. 11, the move control unit 13 knocks back the enemy character c21 to a predetermined position (destination position p21) within the enemy troop region E present in a predetermined direction (enemy troop direction d31). The move control unit 13 may knock back the enemy character c21 to the destination position p21, when greater than or equal to a predetermined number of allied characters are present within a predetermined range of the enemy character c21.

S27*b*: When the enemy character c22 is not positioned within the allied troop region A as illustrated in FIG. 11 in S25*b* described above, the move control unit 13 knocks back the enemy character c22 in a predetermined direction (enemy troop direction d32). In this case, the move control unit 13 does not intentionally control the enemy character c22 to move into within the enemy troop region E, but results in knocking back the enemy character c22 to a predetermined position (destination position p22) within the enemy troop region E because the battling position of the enemy character c22 is on the front line of the enemy troop region E as illustrated in FIG. 11. The enemy troop direction d31 and the enemy troop direction d32 are the same direction as the enemy troop direction d3 of FIG. 5. Regarding the travelling distance to be traveled upon the knockback in FIG. 11, the travelling distance of the enemy character c21 is longer than the travelling distance (an example of a predetermined distance) of the enemy character c22.

Effects of Embodiment

As described above, according to the second embodiment, it is possible to provide an effect of varying the destination positions to be traveled to (or the travelling distances to be traveled) upon a knockback, in accordance with the positions of the attacked enemy characters c21 and c22, in addition to the effects of the first embodiment. Hence, it is possible to push back the enemy character c21, who is left to stand alone in the allied troop region A, into the enemy troop region E, and to avoid as much as possible enemy characters and allied characters becoming mingled and out-of-order.

Third Embodiment

Process or Operation of Embodiment

Figure 12:
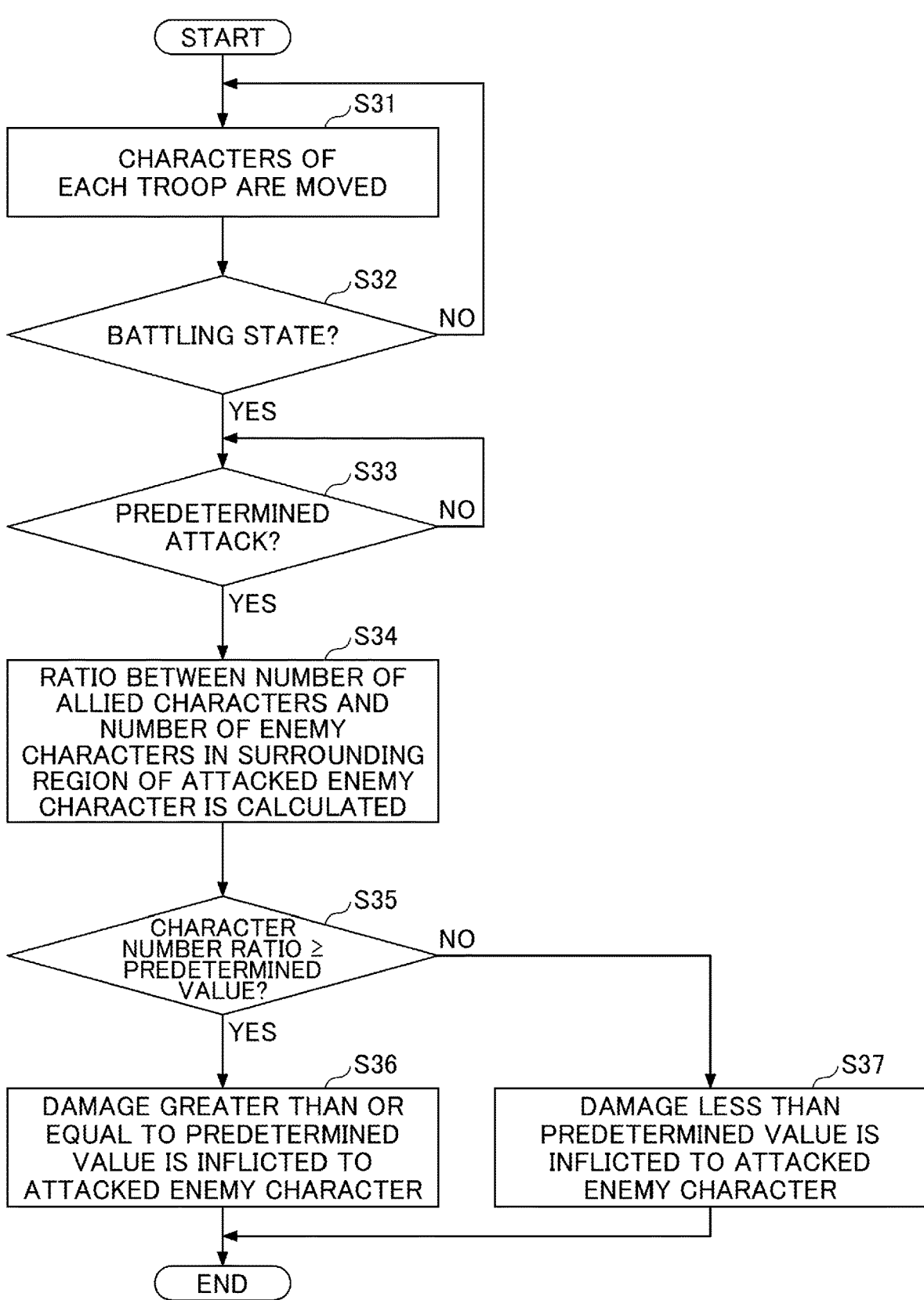
FIG. 12 is a flowchart illustrating a method for controlling moves of a character according to a third embodiment.
Figure 13:
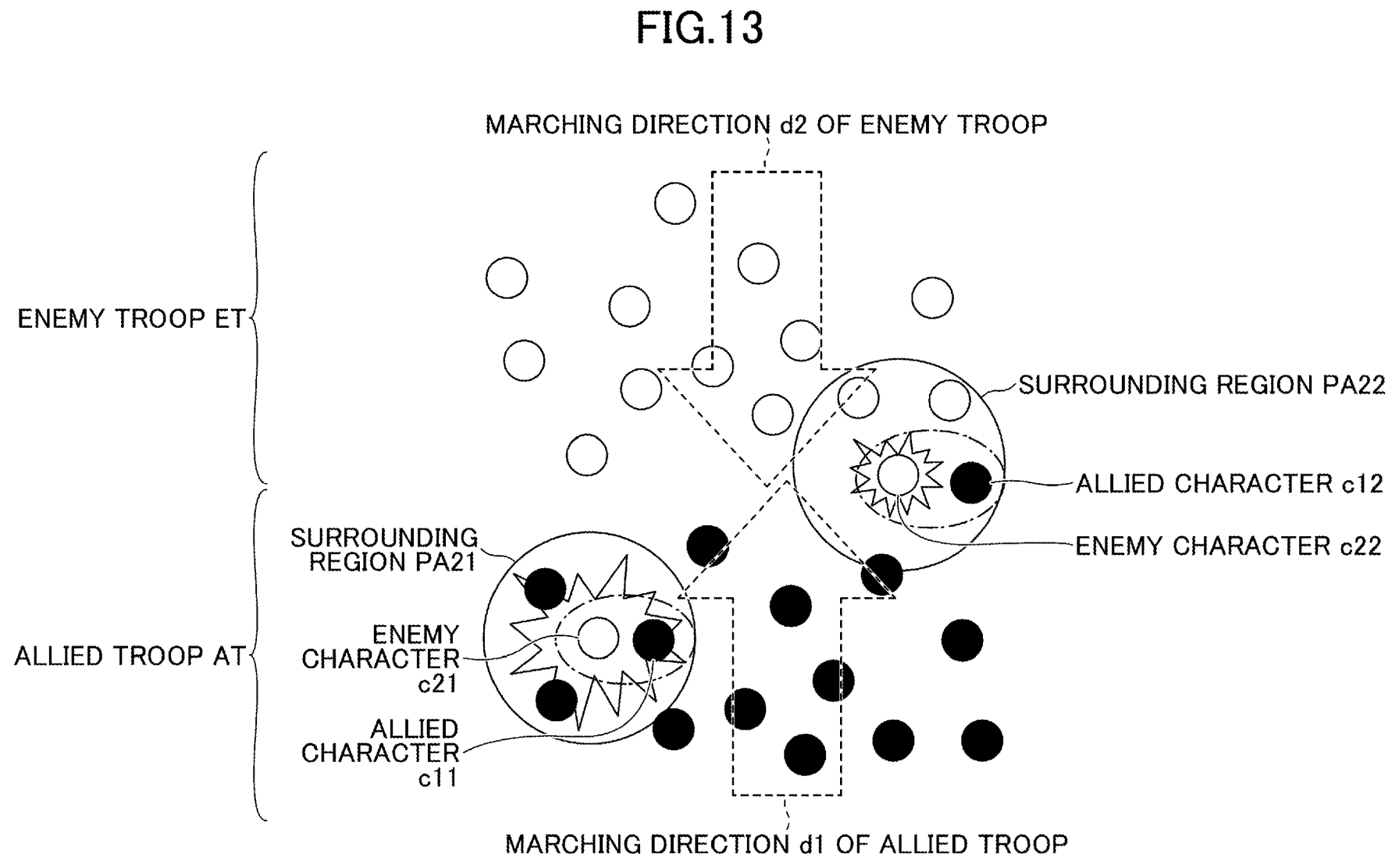
Figure 14:
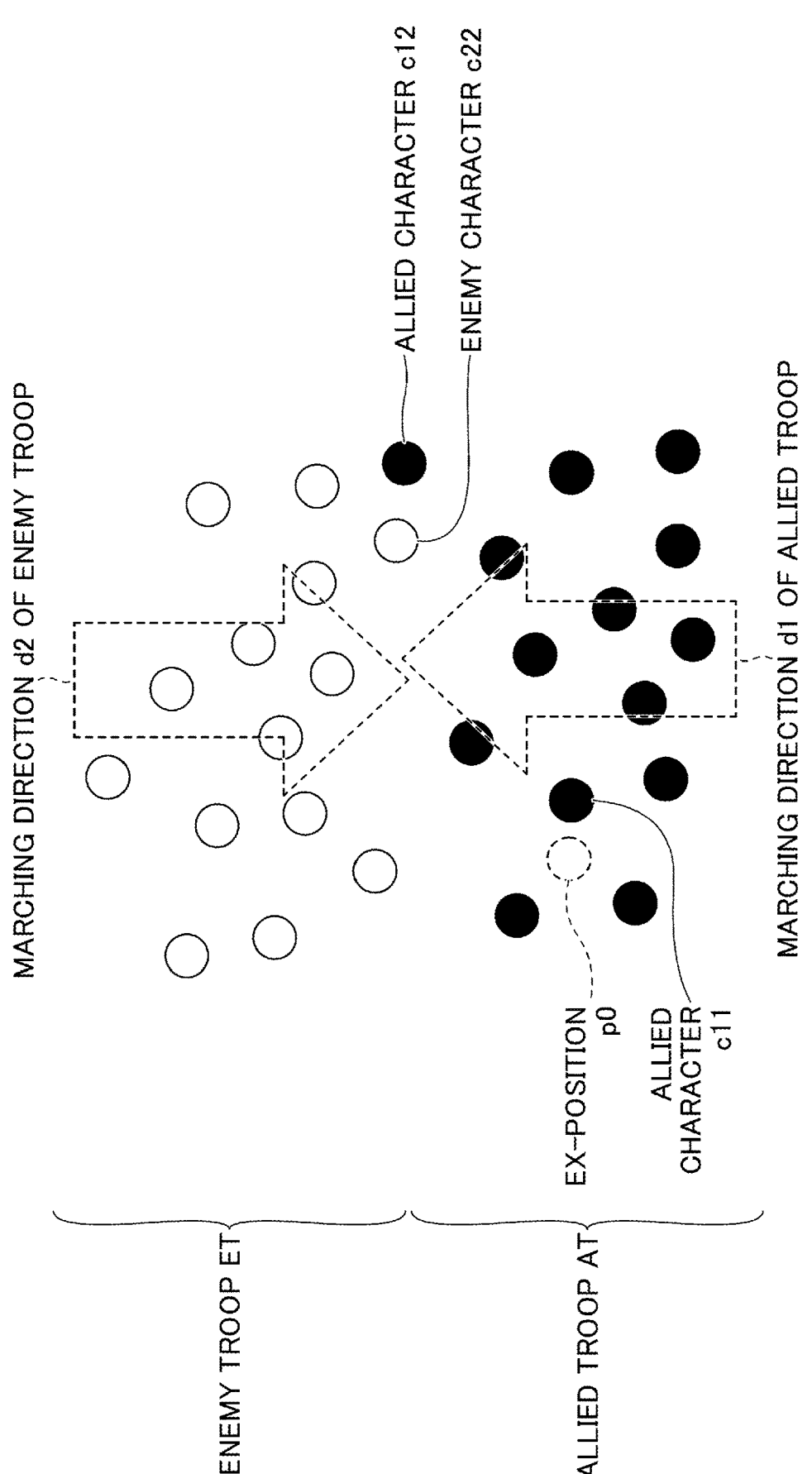
FIG. 14 is a diagram illustrating the position of an enemy character after being damaged.

Next, with reference to FIG. 12 to FIG. 14, the process or operation of the third embodiment will be described. FIG. 12 is a flowchart illustrating a method for controlling the moves of a character according to the third embodiment. FIG. 13 is a diagram illustrating damage levels of enemy characters. FIG. 14 is a diagram illustrating the position of an enemy character after being damaged. S31 to S35 of FIG. 12 are the same processes as S21 to S25*a* of FIG. 8. Hence, description of the flowchart starts from S36 by omitting S31 to S35.

S36: When the ratio is greater than or equal to the predetermined value (S35; YES), the damage control unit 19 inflicts damage of a first level that is greater than or equal to a predetermined value to an enemy character, who has been attacked. For example, as illustrated in FIG. 14, the damage control unit 19 extinguishes the enemy character c21. FIG. 14 indicates the ex-position p0 at which the enemy character c21 had been existing before being extinguished.

S37: When the ratio is not greater than or equal to the predetermined value (i.e., is less than the predetermined value) (S35; NO), the damage control unit 19 inflicts damage of a second level that is less than the predetermined value to the attacked enemy character. The second level is lower than the first level. For example, as illustrated in FIG. 14, the damage control unit 19 inflicts damage of a non-extinctive level to the enemy character c22.

Also in the third embodiment, the position determining unit 18 may determine the position of the attacked enemy character as in the modified example of the second embodiment. In this case, when an enemy character c21 is positioned within the allied troop region A, the damage control unit 19 inflicts damage that is greater than or equal to the predetermined value to the enemy character c21. On the other hand, when an enemy character c22 is not positioned within the allied troop region A, the damage control unit 19 inflicts damage that is less than the predetermined value to the attacked enemy character.

Effects of Embodiment

As described above, according to the third embodiment, it is possible to provide an effect of varying damage to be inflicted, in accordance with the positions of the attacked enemy characters c21 and c22, in addition to the effects of the first embodiment. Hence, it is possible to extinguish the enemy character c21, who is left to stand alone in the allied troop region A, and to avoid as much as possible enemy characters and allied characters becoming mingled and out-of-order.

[Note]

The present disclosure is not limited to the embodiments described above, and may include the following configuration or processes (operations).

In the embodiments described above, battle scenes between the allied troop AT and the enemy troop ET have been described. However, one allied character c1 may battle against an enemy troop ET.

The program described above may be recorded in a (non-transitory) recording medium, or may be provided through a network such as the Internet.

There may be one processor 101, or a plurality of processors 101.

What is claimed is:

1. A non-transitory computer-readable recording medium having stored therein a game control program controlling a video game in which characters battle against each other in a three-dimensional virtual space, and causing a computer to execute:

determining whether a second character has received a predetermined attack from a first character when the first character is battling against the second character, who is an enemy of the first character; and controlling the second character to perform a predetermined move in a direction toward a troop to which the second character belongs, in a case where the second character has received the predetermined attack, wherein the direction toward the troop to which the second character belongs is a direction opposite to a marching direction of the troop to which the second character belongs, and wherein, in controlling the second character to perform the predetermined move in the direction toward the troop to which the second character belongs, the direction is a corrected direction obtained as a resultant vector of a vector indicating the direction toward the troop to which the second character belongs and another vector indicating a direction that is a natural course to be taken as a direction in which the second character performs the predetermined move and that exists on an extension of a line running from the first character to the second character.

2. The non-transitory computer-readable recording medium according to claim 1, wherein the predetermined move is knockback, blow off, or warp.

3. The non-transitory computer-readable recording medium according to claim 1, the game control program further causing the computer to execute: bringing up a display in which the first character performs a motion of swinging a weapon in accordance with the direction toward the troop to which the second character belongs.

4. The non-transitory computer-readable recording medium according to claim 1, wherein the predetermined attack is a contact attack, a contactless attack, a direct attack, or an indirect attack.

5. A non-transitory computer-readable recording medium having stored therein a game control program controlling a video game in which characters battle against each other in a three-dimensional virtual space, the game control program causing a computer to execute:

determining whether a second character has received a predetermined attack from a first character when the first character is battling against the second character, who is an enemy of the first character;

controlling the second character to perform a predetermined move in a direction toward a troop to which the second character belongs, in a case where the second character has received the predetermined attack; and calculating a ratio between a number of characters belonging to a troop to which the first character belongs and a number of characters belonging to the troop to which the second character belongs, in a predetermined surrounding region of the second character in the three-dimensional virtual space, in the case where the second character has received the predetermined attack, wherein the second character is controlled to perform the predetermined move in the direction toward the troop to which the second character belongs, while varying a distance, by which the second character is controlled to perform the predetermined move, in accordance with the ratio, and wherein varying the distance, by which the second character is controlled to perform the predetermined move, includes:

controlling the second character to move by a first distance, in a case where the ratio of the number of characters belonging to the troop to which the first character belongs to the number of characters belonging to the troop to which the second character belongs is greater than or equal to a predetermined value, and controlling the second character to move by a second distance that is shorter than the first distance, in a case where the ratio of the number of characters belonging to the troop to which the first character belongs to the number of characters belonging to the troop to which the second character belongs is less than the predetermined value.

6. The non-transitory computer-readable recording medium according to claim 5, wherein the predetermined surrounding region is a region within a circle centering on the second character and having a radius that is a predetermined multiple of a length between predetermined parts of the second character.

7. The non-transitory computer-readable recording medium according to claim 6, wherein the length between the predetermined parts is a shoulder width of the second character.

8. The non-transitory computer-readable recording medium according to claim 5, the game control program further causing the computer to execute:

determining a position of the second character in the three-dimensional virtual space, in the case where the second character has received the predetermined attack, wherein the controlling includes controlling the second character to perform the predetermined move in the direction toward the troop to which the second character belongs while varying a distance by which the controlling controls the second character to perform the predetermined move in accordance with the position of the second character.

9. The non-transitory computer-readable recording medium according to claim 8, wherein the controlling includes, as the varying of the distance by which the controlling controls the second character to perform the predetermined move, controlling the second character to move by a first distance in a case where the second character is positioned within a region of the troop to which the first character belongs, and controlling the second character to move by a second distance shorter than the first distance in a case where the second character is not positioned within the region of the troop to which the first character belongs.

10. The non-transitory computer-readable recording medium according to claim 9, wherein the region of the troop to which the first character belongs is a region in which a number of characters belonging to the troop to which the first character belongs is greater than or equal to a first proportion, and a number of characters belonging to the troop to which the second character belongs is less than a second proportion, which is lower than the first proportion.

11. The non-transitory computer-readable recording medium according to claim 5, the game control program further causing the computer to execute:

inflicting damage of a varying level to the second character in accordance with the ratio.

12. The non-transitory computer-readable recording medium according to claim 11, wherein the inflicting of the damage of the varying level to the second character includes inflicting the damage of a first level to the second character in a case where the ratio of the number of characters belonging to the troop to which the first character belongs to the number of characters belonging to the troop to which the second character belongs in the predetermined surrounding region is greater than or equal to a predetermined value, and inflicting the damage of a second level lower than the first level to the second character in a case where the ratio of the number of characters belonging to the troop to which the first character belongs to the number of characters belonging to the troop to which the second character belongs in the predetermined surrounding region is less than the predetermined value.

13. The non-transitory computer-readable recording medium according to claim 12, wherein the damage of the first level is to extinguish the second character.

14. The non-transitory computer-readable recording according to claim 12, the game control program further causing the computer to execute: determining a position of the second character in the three-dimensional virtual space, in a case where the second character has received the predetermined attack; and inflicting damage of a varying level to the second character in accordance with the position of the second character.

15. The non-transitory computer-readable recording medium according to claim 14, wherein the inflicting of the damage of the varying level to the second character includes inflicting the damage of a first level to the second character in a case where the second character is positioned within a region of a troop to which the first character belongs, and inflicting the damage of a second level lower than the first level to the second character in a case where the second character is not positioned within the region of the troop to which the first character belongs.

16. The non-transitory computer-readable recording medium according to claim 5, wherein the predetermined attack is a contact attack, a contactless attack, a direct attack, or an indirect attack.

17. A game control method performed by an information processing apparatus configured to control a video game in which characters battle against each other in a three-dimensional virtual space, the game control method comprising:

determining whether a second character has received a predetermined attack from a first character when the first character is battling against the second character, who is an enemy of the first character; and controlling the second character to perform a predetermined move in a direction toward a troop to which the second character belongs, in a case where the second character has received the predetermined attack, wherein the direction toward the troop to which the second character belongs is a direction opposite to a marching direction of the troop to which the second character belongs, and wherein, in controlling the second character to perform the predetermined move in the direction toward the troop to which the second character belongs, the direction is a corrected direction obtained as a resultant vector of a vector indicating the direction toward the troop to which the second character belongs and another vector indicating a direction that is a natural course to be taken as a direction in which the second character performs the predetermined move and that exists on an extension of a line running from the first character to the second character.

18. An information processing apparatus configured to control a video game in which characters battle against each other in a three-dimensional virtual space, the information processing apparatus comprising:

an attack content determining unit configured to determine whether a second character has received a predetermined attack from a first character when the first character is battling against the second character, who is an enemy of the first character; and a move control unit configured to control the second character to perform a predetermined move in a direction toward a troop to which the second character belongs, in a case where the second character has received the predetermined attack, wherein the direction toward the troop to which the second character belongs is a direction opposite to a marching direction of the troop to which the second character belongs, and wherein, in the move control unit controlling the second character, to perform the predetermined move in the direction toward the troop to which the second character belongs, the direction is a corrected direction obtained as a resultant vector of a vector indicating the direction toward the troop to which the second character belongs and a vector indicating a direction that is a natural course to be taken as a direction in which the second character performs the predetermined move and that exists on an extension of a line running from the first character to the second character.

19. A game control method performed by an information processing apparatus configured to control a video game in which characters battle against each other in a three-dimensional virtual space, the game control method comprising:

determining whether a second character has received a predetermined attack from a first character when the first character is battling against the second character, who is an enemy of the first character;

controlling the second character to perform a predetermined move in a direction toward a troop to which the second character belongs, in a case where the second character has received the predetermined attack; and calculating a ratio between a number of characters belonging to a troop to which the first character belongs and a number of characters belonging to the troop to which the second character belongs in a predetermined surrounding region of the second character in the three-dimensional virtual space, in the case where the second character has received the predetermined attack, wherein the second character is controlled to perform the predetermined move, in the direction toward the troop to which the second character belongs, while varying a distance by which the second character is controlled to perform the predetermined move, in accordance with the ratio, and wherein varying the distance, by which the second character is controlled to perform the predetermined move, includes:

controlling the second character to move by a first distance, in a case where the ratio of the number of characters belonging to the troop to which the first character belongs to the number of characters belonging to the troop to which the second character belongs is greater than or equal to a predetermined value, and controlling the second character to move by a second distance that is shorter than the first distance, in a case where the ratio of the number of characters belonging to the troop to which the first character belongs to the number of characters belonging to the troop to which the second character belongs is less than the predetermined value.

20. An information processing apparatus configured to control a video game in which characters battle against each other in a three-dimensional virtual space, the information processing apparatus comprising:

an attack content determining unit configured to determine whether a second character has received a predetermined attack from a first character when the first character is battling against the second character, who is an enemy of the first character;

a move control unit configured to control the second character to perform a predetermined move in a direction toward a troop to which the second character belongs, in a case where the second character has received the predetermined attack; and a character number ratio calculating unit configured to calculate a ratio, between a number of characters belonging to a troop to which the first character belongs and a number of characters belonging to the troop to which the second character belongs, in a predetermined surrounding region of the second character in the three-dimensional virtual space, in the case where the second character has received the predetermined attack, wherein the move control unit controls the second character to perform the predetermined move in the direction toward the troop to which the second character belongs while varying a distance by which the move control unit controls the second character to perform the predetermined move in accordance with the ratio, and wherein the move control unit varying the distance, by which the second character is controlled to perform the predetermined move, includes:

controlling the second character to move by a first distance, in a case where the ratio of the number of characters belonging to the troop to which the first character belongs to the number of characters belonging to the troop to which the second character belongs is greater than or equal to a predetermined value, and controlling the second character to move by a second distance that is shorter than the first distance, in a case where the ratio of the number of characters belonging to the troop to which the first character belongs to the number of characters belonging to the troop to which the second character belongs is less than the predetermined value.

* * * * *